United States Patent
Lange et al.

(10) Patent No.: US 10,461,839 B2
(45) Date of Patent: Oct. 29, 2019

(54) DIGITAL REPEATER SYSTEM

(71) Applicant: Andrew Wireless Systems GmbH, Buchdorf (DE)

(72) Inventors: Keld Knut Lange, Oetisheim (DE); Alfons Dussmann, Gansheim (DE); Daniel Schwab, Gersthofen (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/560,113

(22) PCT Filed: Oct. 19, 2015

(86) PCT No.: PCT/IB2015/058038
§ 371 (c)(1),
(2) Date: Sep. 20, 2017

(87) PCT Pub. No.: WO2016/156950
PCT Pub. Date: Oct. 6, 2016

(65) Prior Publication Data
US 2018/0102829 A1    Apr. 12, 2018

(30) Foreign Application Priority Data
Mar. 27, 2015 (EP) .................................... 15161404

(51) Int. Cl.
*H04B 7/155* (2006.01)
*H04B 17/336* (2015.01)

(52) U.S. Cl.
CPC ....... *H04B 7/15535* (2013.01); *H04B 17/336* (2015.01)

(58) Field of Classification Search
USPC .......................................... 375/222; 341/110
See application file for complete search history.

(56) References Cited

U.S. PATENT DOCUMENTS

| 7,953,505 B2* | 5/2011 | Suzuki | H03H 17/0294 |
| | | | 700/94 |
| 2012/0308029 A1* | 12/2012 | Christoph | H03H 17/0229 |
| | | | 381/71.12 |

(Continued)

FOREIGN PATENT DOCUMENTS

EP    2533433    3/2014

OTHER PUBLICATIONS

International Searching Authority, "International Search Report and Written Opinion from PCT Application No. PCT/IB2015/058038 dated Dec. 23, 2015", "from PCT Application No. PCT/IB2015/058038", dated Dec. 23, 2015, pp. 1-12, Published in: WO.

*Primary Examiner* — David C Payne
*Assistant Examiner* — Sarah Hassan
(74) *Attorney, Agent, or Firm* — Fogg & Powers LLC

(57) ABSTRACT

A digital repeater system for repeating RF signals can include a receiving section for receiving an RF input signal that includes a frequency band with at least one subband associated with a communication channel of a telecommunications network. The receiving section can digitize the RF input signal to obtain a digital signal. A filter device includes a digital filter with a passband for filtering the digital signal. The digital filter is configurable by setting filter coefficients. A gain control device can set the gain of at least a portion of the digital signal. A transmitting section can transmit an RF output signal and can convert the digital signal to the RF output signal for transmission. A control unit can configure the filter coefficients of the digital filter based on the gain setting of the gain control device.

20 Claims, 4 Drawing Sheets

(56) References Cited

U.S. PATENT DOCUMENTS

2013/0177047 A1\* 7/2013 Kwak .................... H04B 7/155
 375/211
2013/0189921 A1\* 7/2013 Maca ................. H03H 17/0216
 455/9
2014/0050253 A1 2/2014 Jovanovic \* cited by examiner

DIGITAL REPEATER SYSTEM

CROSS-REFERENCE TO RELATED APPLICATION

This application is a U.S. National Stage application of PCT Application Serial No. PCT/IB2015/058038, filed 19 Oct. 2015 and titled "Digital Repeater System," which claims priority to European Patent Application number EP15161404.7, titled "Digital repeater system" and filed Mar. 27, 2015, the entire contents of all of which are incorporated herein by reference.

TECHNICAL FIELD

The present disclosure relates generally to a digital repeater system for repeating RF signals and to a method for controlling a digital repeater system.

BACKGROUND

Repeater systems can serve a wide frequency band, for example a complete 3GPP band. A frequency band typically contains multiple carriers carrying information according to different communication technologies and standards such as GSM, UMTS, LTE, or the like.

A repeater system can be used on a train to provide network coverage within the train. High-speed train applications can present extremely challenging RF environments. The complexities of different terrain combined with rapidly changing outdoor signal levels of the various networks can make it difficult for operators to provide the coverage and service their customers demand while travelling from city to city or to another country. To improve the reliability of wireless signals on trains, repeater systems in the shape of distributed antenna systems (DAS) can be cost-effective. A DAS may for example be installed within a train and serve to amplify a signal to compensate an attenuation caused by the train (due to, for example, metalized windows on high-speed trains reducing signal penetration into the train carriages, which may result in spotty coverage and dropped calls).

The signal strength available from macro-cells of base stations outside a train can vary as the train moves. In some areas with good network coverage, the signal inside the train may be strongly overlaid by the base station's original source signal. A mobile station within a train carriage may at the same time receive signals from a base station outside the train on a direct path and on an indirect path via the DAS installed on the train. This multipath propagation can cause dropped connections or can reduce data throughput in case the delay between the signals received via the different paths exceeds some limit.

For example, in an LTE network the delay spread can be limited by the time of the cyclic prefix (CP). If the delay between different signal paths is larger than the CP used, there is a risk that calls are being dropped or that the data throughput is reduced.

A solution to decrease the risk for dropped connections is to increase the CP. This however comes with the inherent drawback of a reduced data throughput.

SUMMARY

In one example, a digital repeater system can repeat RF signals. The digital repeater system includes a receiving section, a filter device, a gain control device, a transmitting section, and a control unit. The receiving section can be configured for receiving an RF input signal that includes at least one frequency band having at least one subband associated with at least one communication channel of a telecommunications network. The receiving section can be configured to digitize the RF input signal to obtain a digital signal. The filter device includes at least one digital filter having a passband for digitally filtering the digital signal. The digital filter is configurable by setting filter coefficients. The gain control device is configurable to set a gain of at least a portion of the digital signal. The transmitting section is configured for transmitting an RF output signal and for converting the digital signal to the RF output signal for transmission. The control unit is adapted to configure the filter coefficients of the at least one digital filter based on the gain setting of the gain control device.

In another example, a method is provided that includes:
receiving an RF input signal by a receiving section of a digital repeater system, the RF input signal comprising at least one frequency band including at least one subband associated with at least one communication channel of a telecommunications network, the receiving section digitizing the RF input signal to form a digital signal;
digitally filtering the digital signal by a filter device comprising at least one digital filter having a passband for filtering the digital signal, wherein the at least one digital filter is configured by setting filter coefficients;
controlling a gain of the digital signal by a gain control device that sets the gain of the digital signal;
configuring the filter coefficients of the at least one digital filter based on the gain of the gain control device set by a control unit; and
converting the digital signal to an RF output signal and transmitting the RF output signal by at least one transmitting section of the digital repeater system.

DETAILED DESCRIPTION

Figure 1:
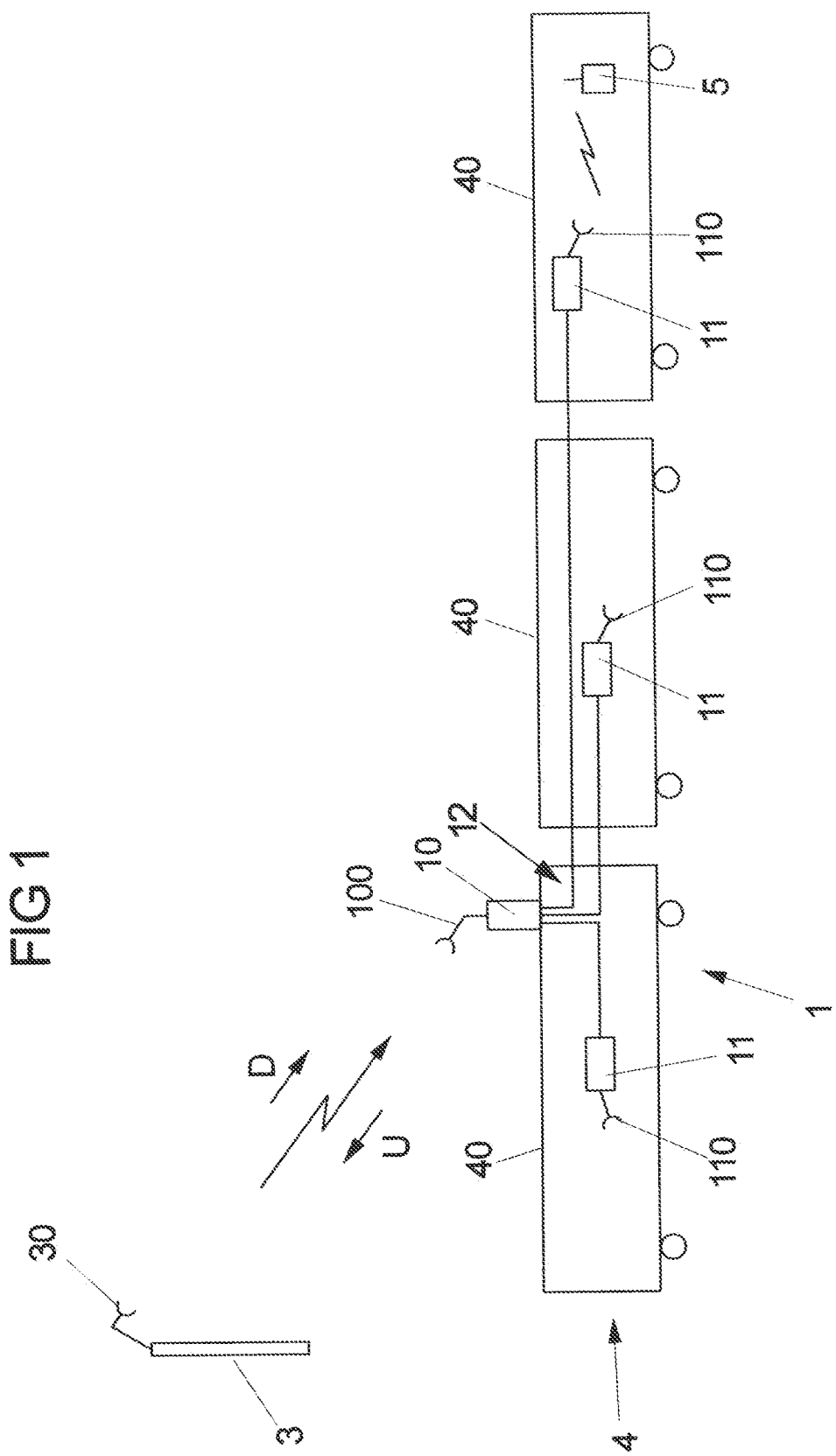
FIG. 1 shows a schematic overview of a digital repeater system that includes a host unit connected to multiple remote units according to one aspect.

Certain aspects and features relate to a digital repeater system for repeating RF signals. The digital repeater system includes a receiving section for receiving an RF input signal. The RF input signal includes at least one frequency band with at least one subband associated with at least one communication channel of a telecommunications network. The receiving section can digitize the RF input signal to obtain a digital signal. The digital repeater system also includes a filter device with at least one digital filter for digitally filtering the digital signal. The digital filter can have a passband for filtering the digital signal. The digital filter is configurable by setting filter coefficients. A gain control device can control the gain of the digital signal. The gain control device can be configured to set the gain of at least a portion of the digital signal. The digital repeater system also includes at least one transmitting section for transmitting an RF output signal. The transmitting section can convert the digital signal to the RF output signal for transmission.

A digital repeater system according to some examples can reduce the risk for dropped calls within a train environment when using the repeater system, while at the same time being able to obtain a high data throughput.

A control unit can be used to configure the filter coefficients of the digital filter depending on the gain setting of the gain control device. The group delay observed within a repeater system can depend on the use of filter coefficients of the digital filters within the repeater system. By configuring the filter coefficients of the digital filters within the digital repeater system, the group delay may be adjusted such that a delay of a signal path through the repeater system and a direct signal path in between a base station and a mobile station does not exceed a predefined limit (such as, in an LTE network, the cyclic prefix).

Generally, if a repeater system uses a high gain setting and, for a subband or for the overall frequency band processed by the repeater system, provides a large gain, the digital filters processing the separate subbands contained in the frequency band can have a large steepness—e.g., the transition between the passband and an out-of-band region is steep to cause a strong and sharp rejection of out-of-band signals. This can avoid amplifying unwanted signals outside the passband more than permitted by a predefined gain limit.

If a low gain setting is used, the risk that the predefined gain limit outside the passband is exceeded may be small. The frequency response defining the passband of the filter may have a reduced steepness—e.g., the transition between the passband and an adjacent out-of-band region may be less sharp.

If a filter has a reduced steepness, it can be realized by using fewer filter coefficients, for example when using a FIR filter. When using only a small number of filter coefficients, the processing within the filters of the repeater system can be fast, causing a reduced group delay and inducing a reduced delay between a signal path through the repeater system and a direct signal path between a base station and a mobile station.

By optimizing the filter coefficients, in particular by optimizing the number of filter coefficients used for defining the digital filter, the group delay can be optimized, which may depend on a gain setting.

For a high gain setting, a larger number of filter coefficients can be used to cause the filter to exhibit a large steepness. Such high gain setting may be suitable if an outside network coverage by one or multiple base stations is weak and received signals of a telecommunications network are amplified to provide coverage within a train. In this scenario, the signals received within the train by a mobile station may come predominantly from the repeater system, such that the signals provided via the repeater system may dominate over the directly received system from the base station.

If the network coverage provided by a base station is good, the repeater system may use a lower gain setting and may use a filter having a reduced steepness by using fewer filter coefficients, causing a smaller group delay. In this case, the signals received within a train may predominantly come directly from the base station, where the group delay between the directly received signals and the signals coming from the repeater system is small to reduce the risk for dropped connections.

The control unit may be configured to adjust the steepness or the width of the passband of one or multiple digital filters by setting the filter coefficients of the digital filters. In particular, when using a digital filter having a passband with a large steepness, a comparatively large number of the filter coefficients may be used. In turn, if a digital filter having a passband with a reduced steepness (e.g., a less sharp transition between the passband and an out-of-band region) is used, fewer filter coefficients may be used, causing a smaller group delay.

The digital filter may be a FIR (finite impulse response) filter. But, other types of filters can also be used.

Adjusting the filter coefficients may be triggered by a change in the gain setting. A change in the gain setting may be triggered based on a network coverage in an area. The network coverage in an area may be determined by measuring a received (e.g., reference) signal from a base station. Alternatively, the network coverage may be determined by using location information obtained from a positioning system, for example a GPS signal, making use of the knowledge that in a particular area good or bad network coverage is provided.

In one embodiment, the digital repeater system includes a host unit and one or multiple remote units connected to the host unit. The host unit may for example be located at a central location on a train, whereas the remote units are distributed over different carriages of the train to provide coverage within the train. Both the host unit and the remote units may include a receiving section and a transmitting section. In a downlink direction, the receiving section of the host unit can receive an RF signal from one or multiple base stations of one or multiple communication networks via an air interface, process the RF signal, and provide it to the transmitting sections of the different remote units for retransmission via the remote units. In the uplink direction, the receiving section of a remote unit can receive an RF signal from inside the train and provide the RF signal, after processing, to the transmitting section of the host unit for transmission towards an outside communication network.

In an example, the functions of the receiving section and the transmitting section may also be distributed over the host unit and the remote units or one or multiple intermediate units located between the host unit and the remote units. For example, in the uplink direction an RF signal may be received at one or multiple remote units and may be forwarded to an intermediate unit located in the vicinity of the host unit. In the intermediate unit, the signals received from the remote units can be processed, aggregated, and provided to the host unit for transmission to an outside network. In this example, the digital filters may be located in the intermediate unit such that a majority of the processing on the receiving side is carried out in the intermediate unit.

A digital repeater system according to some examples can provide a distributed coverage solution such that an RF signal that includes a frequency band with various subbands associated with various radio technologies such as a GSM, UMTS, LTE, signals in a 3GPP frequency band, etc., may be distributed via a host unit to multiple remote units to provide coverage in an obstructed area. The remote units may be connected to the host unit via a network of optical fibers or via an air interface or another RF connection means.

FIG. 1 shows, in a schematic drawing, a digital repeater system 1 that is a distributed antenna system (DAS) with a host unit 10 and multiple remote units 11. The host unit 10 may be located at a central location on a train 4 and be associated with or include an antenna 100 via which the host unit 10 can communicatively couple to one or multiple base stations 3 of one or multiple communication networks using an air interface. The remote units 11 are located within different carriages 40 of the train 4 and serve to provide coverage throughout the different carriages 40 of the train 4.

The repeater system 1, however, may be used in a different environment, such as in or on a building. In this case, the host unit 10 may be located outside of the building and may communicate with remote units 11 inside the building.

In contrast to the example of FIG. 1, separate repeater systems in which a host unit and a (single) remote unit are integrated into one combined unit may instead be installed on the different carriages 40 of the train 4. In this case, the repeater system can be implemented as an integrated unit installed on a carriage, not as a distributed system as in the example of FIG. 1.

The remote units 11 are connected to the host unit 10 via a transport medium 12, for example a network of optical fibers, and can be in communication connection with the host unit 10. Each remote unit 11 comprises an antenna 110 via which the remote unit 11 for example is connected to a mobile device 5 of a user in a carriage 40 of the train 4.

In a downlink direction D, an RF input signal $RF_{IN}$ is received via the antenna 100 at the host unit 10, processed within the host unit 10 for transporting it via the transport medium 12 to the different remote units 11 and, after further processing, transmitted via the antennas 110 as an RF output signal $RF_{OUT}$. The RF output signal $RF_{OUT}$ may be received by a mobile device 5 in a carriage 40 of the train 4.

Vice versa, in an uplink direction U an RF signal received at the antenna 110 of a remote unit 11 is fed via the transport medium 12 to the host unit 10 and is retransmitted via the antenna 100 towards an antenna 30 of a base station 3 of an outside communication network.

Figure 2:
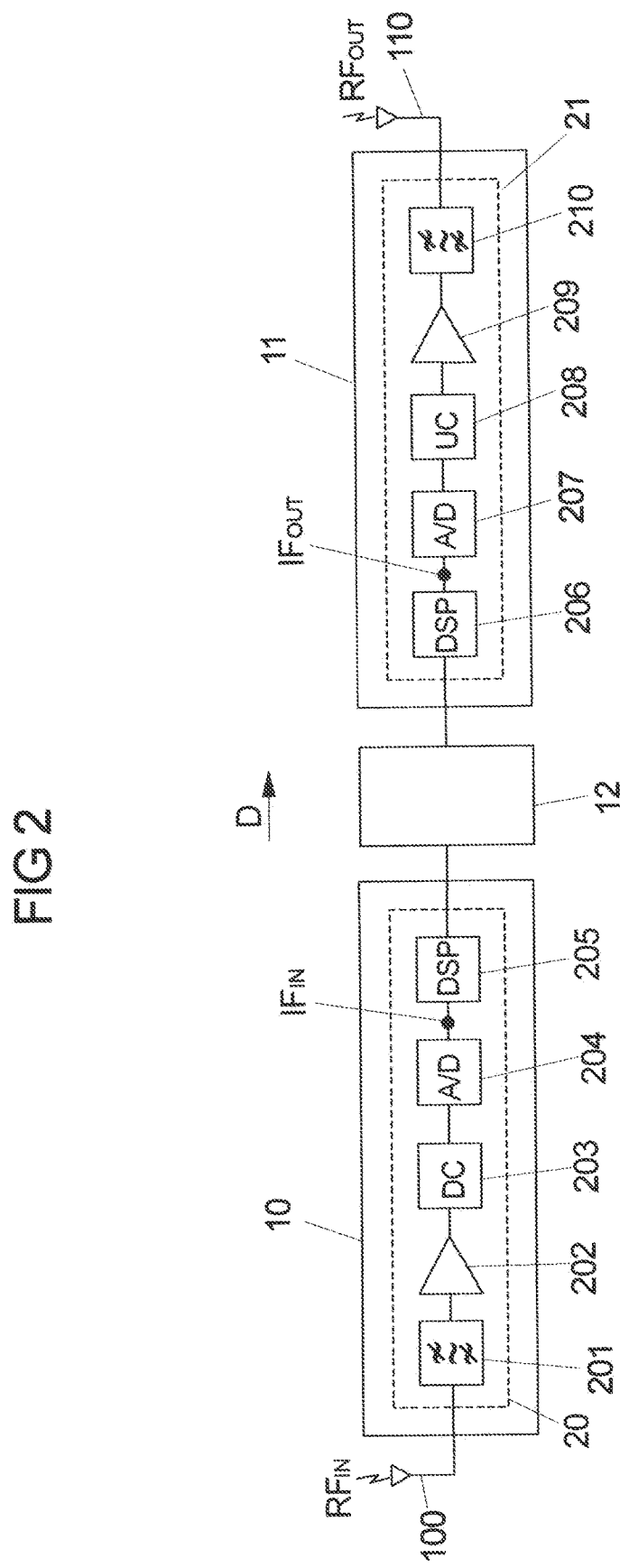
FIG. 2 shows a schematic drawing of functional processing blocks in the host unit and a remote unit for digital processing of an RF signal in a downlink direction according to one aspect.

The digital repeater system 1 can perform digital processing of the RF signal, as functionally shown in FIG. 2. FIG. 2 depicts functional entities of the host unit 10 and a remote unit 11 connected via the transport medium 12 to the host unit 10 that are used in the downlink direction D for processing the RF input signal $RF_{IN}$ for retransmission.

In the embodiment of FIG. 2, the host unit 10 includes a receiving section 20 for processing an RF input signal $RF_{IN}$ received by the antenna 100. In particular, the receiving section 20 includes an RF filter 201 in the shape of a bandpass filter for filtering out a frequency band to be processed and transported for retransmission. From the RF filter 201, the RF input signal $RF_{IN}$ can be fed to a low noise amplifier 202 and to a downconverter 203 for downconverting the RF signal into an intermediate frequency band. Subsequently, the signal is fed to an analog-to-digital converter 204 for digitizing the RF signal, such that an intermediate-frequency digital signal $IF_{IN}$ is obtained.

Alternatively, the RF signal can instead be downconverted into a baseband IQ signal (e.g., zero IF).

The digital signal $IF_{IN}$ is fed to a digital signal processing unit (e.g. DSP, FPGA, ASIC, or the like) 205 and is digitally processed in the digital signal processing unit 205.

After digital signal processing, the processed signal is, via the transport medium 12, transported to a digital signal processing unit 206 of a transmitting section 21 of a remote unit 11, in which the signal is further processed such that a digital signal $IF_{OUT}$ in the intermediate frequency range is obtained. This digital signal $IF_{OUT}$ is converted to an analog RF signal by a digital-to-analog converter 207, upconverted by an upconverter 208, power-amplified by a power amplifier 209, filtered by an RF filter 210 in the shape of a bandpass filter, and transmitted as an RF output signal $RF_{OUT}$ via the antenna 110 of the remote unit 11.

Instead of a single digital-to-analog converter, alternatively, two digital-to-analog converters for the I/Q signal paths and an upconversion using a modulator may be used.

In the uplink direction U, an RF input signal is received and processed by an receiving section 20 of a remote unit 11 and is further processed and transmitted via a transmitting section 21 of the host unit 10.

Figure 3:
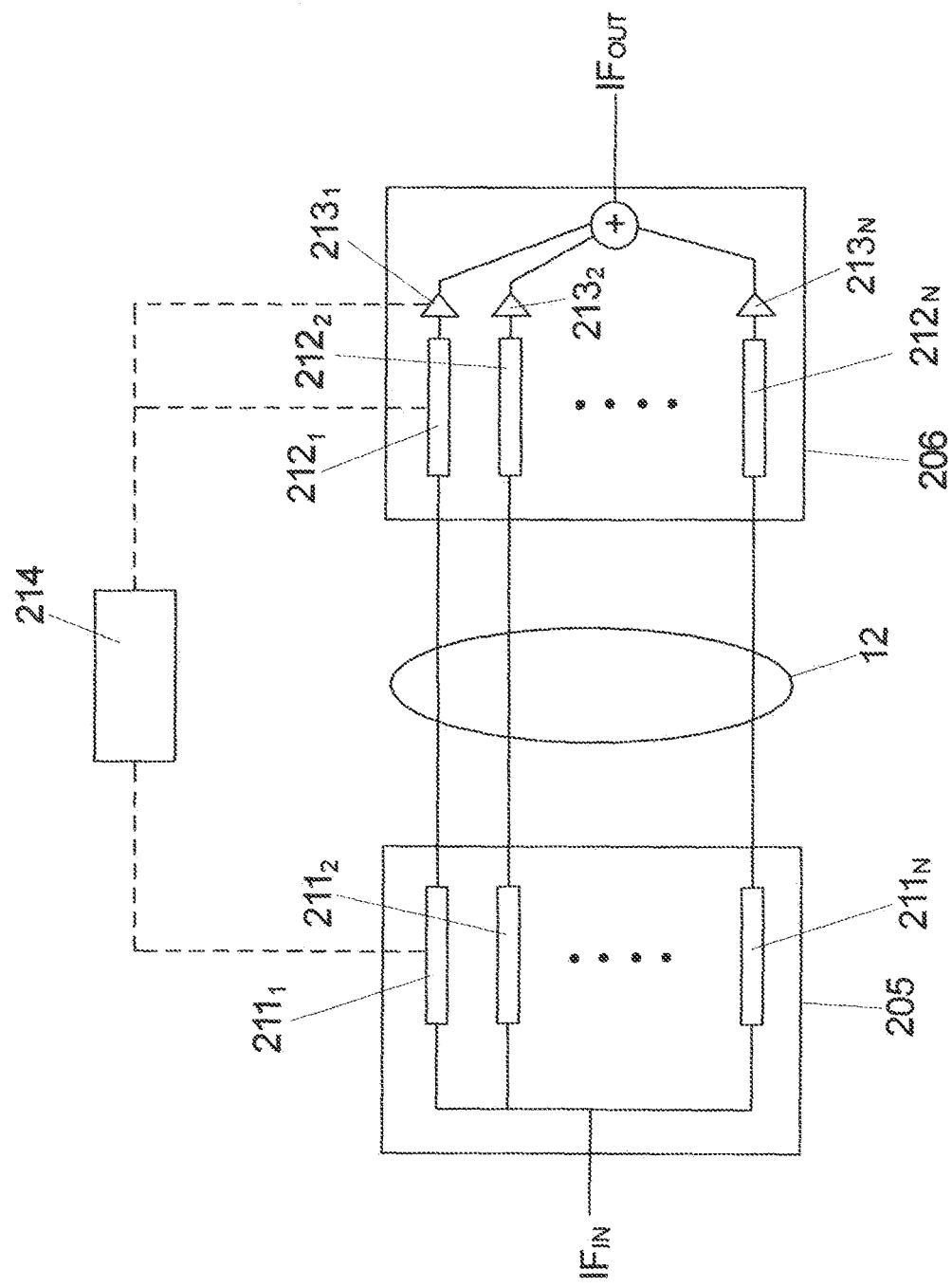
FIG. 3 shows a schematic view of a repeater system according to one aspect.

Within the digital signal processor units 205, 206, digital filtering may occur, as outlined in FIG. 3. Within the digital signal processor units 205, 206, subbands contained in the frequency band processed by the repeater system 1 may be isolated from each other and may be processed separately by digital filters $211_1$-$211_N$, $212_1$-$212_N$. Each digital filter of the digital filters $211_1$-$211_N$, $212_1$-$212_N$ can include a passband associated with a carrier of a communication channel of a communication network. The digital filters $211_1$-$211_N$, $212_1$-$212_N$ may be programmable by a control unit 214 in their bandwidth, their center frequency and their passband characteristics.

Also, a gain control may occur in gain control devices $213_1$-$213_N$ such that the gain of the individual passbands of the digital filters $211_1$-$211_N$, $212_1$-$212_N$ may be set by the control unit 214. Such gain control devices $213_1$-$213_N$ may also be integrated in the digital filters $211_1$-$211_N$, $212_1$-$212_N$.

Figure 4:
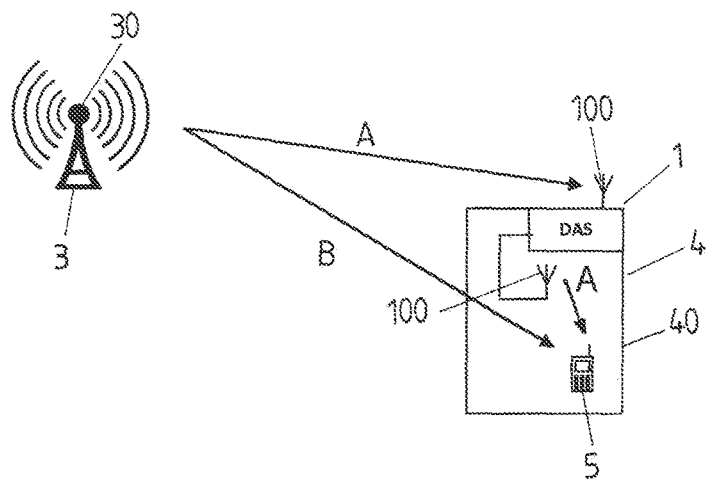
FIG. 4 shows a schematic view of a repeater system in a communication between a base station and a mobile station on a train according to one aspect.

FIG. 4 shows an example of a repeater within a train environment. A mobile device 5 within a carriage 40 of a train 4 may receive signals directly from a base station 3 (e.g., via signal path B) and at the same time may receive signals via a repeater system 1 installed on the train 4 (e.g., via signal path A). Signals can be overlaid within the carriage 40, and if the delay between the different signal paths A, B is too large, for example larger than the cyclic prefix used within an LTE connection, there is a risk that connections are dropped or that the data throughput is reduced.

Figure 5:
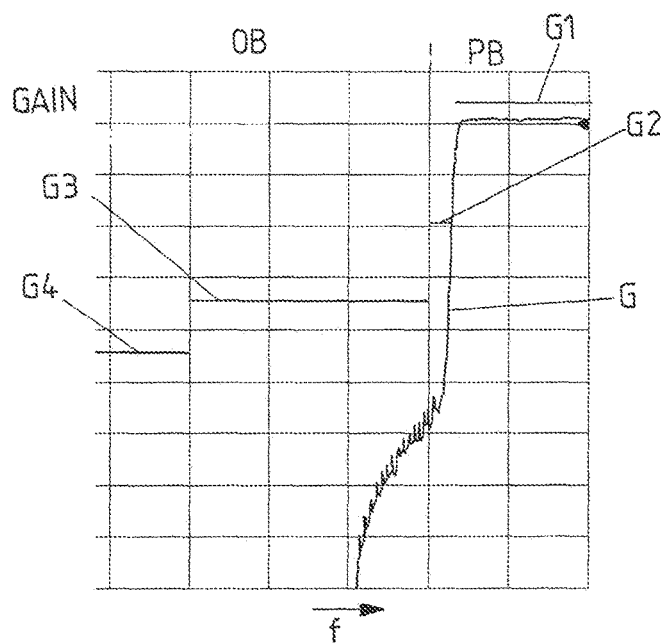
FIG. 5 shows a frequency response of a digital filter according to one aspect.

Each of the digital filters $211_1$-$211_N$, $212_1$-$212_N$ (FIG. 3) has a passband PB as shown in FIG. 5, where the center frequency and bandwidth may vary between the digital filters $211_1$-$211_N$, $212_1$-$212_N$. Within the passband PB, signals are passed having a predefined gain G set by the associated gain control device $213_1$-$213_N$. Outside of the passband PB (out-of-band region OB), signals can be rejected as much as possible and may not be amplified more than determined by predefined gain limits G2, G3, G4 (where gain limit G1 applies for the passband PB), where the gain limits G1-G4 may depend on the network (e.g. FCC, 3GPP, ETSI, etc.).

The characteristics of the passband PB within the frequency response of a digital filter $211_1$-$211_N$, $212_1$-$212_N$ can be determined by filter coefficients, if the digital filter is implemented by a FIR filter, for example. The steepness, e.g., the transition between the passband PB and the out-of-band region OB, can be determined by the number of filter coefficients used. To achieve a sharp transition between the passband PB and the out-of-band region OB, generally a large number of filter coefficients can be used, whereas the use of fewer filter coefficients can result in a reduced steepness. In general, the steepness can be selected such that the gain limits G1, G2, G3, G4 are not exceeded.

Generally, the use of a large number of filter coefficients increases the group delay caused by the repeater system 1. If fewer filter coefficients are used for defining a digital filter $211_1$-$211_N$, $212_1$-$212_N$, the group delay induced by the digital filter is reduced. Optimizing the filter coefficients can optimize the group delay caused by the repeater system 1.

If, for the frequency response of the digital filter $211_1$-$211_N$, $212_1$-$212_N$ shown in FIG. 5, the gain setting is reduced, the requirements for the steepness of the passband PB can be reduced because it is less likely that the gain limits G1-G4 are exceeded. For example, if in FIG. 5 the gain setting within the passband PB is reduced by 40 dB (one division equalling 10 dB), the steepness of the passband PB can be greatly reduced without risking to exceed any of the gain limits G1, G2, G3, G4.

The delay induced by the repeater system 1 can be optimized by setting the filter coefficients depending on the gain setting. The gain setting may be selected based on different criteria.

If a good network coverage is found in an area through which the train 4 passes and the signals received directly from a base station 3 are sufficiently strong to provide coverage within the train 4 (signal path B in FIG. 4), then the gain of the repeater system 1 may be greatly reduced to allow the use of fewer filter coefficients and to improve the delay induced by the repeater system 1 such that the risk for dropped calls is greatly reduced.

If instead the network coverage in an area is poor, the signals received by a mobile device 5 within a carriage 40 of a train 4 may greatly be dominated by the signals received via the repeater system 1 (signal path A). A high gain setting may be used for the repeater system 1 together with a sharp passband PB of a digital filter $211_1$-$211_N$, $212_1$-$212_N$ associated with a communication channel. Because the mobile device 5 can predominantly receive signals via the repeater system 1, but may hardly receive any signals directly from the base station 3, the risk for dropped calls can be low.

Whether network coverage is good or poor may be determined by measuring a reference signal (or similar type of signal) received from the base station 3. Or it may be determined by a positioning system, for example GPS, in what area a train 4 currently is located, where the gain may be set accordingly if it is known for an area that the network coverage in this area is good or bad.

The following are examples of instances in which the requirement for a new gain setting can be triggered:

Maximum gain regulation according to variable gain limit due to user setting.

Maximum gain regulation according to gain limit due to isolation measurement (e.g., gain of DAS is to be lower than the isolation between donor and transmit antenna).

Gain variation according to specific GPS locations (e.g., gain setting and GPS location can be predefined in some kind of look-up table).

Gain variation according to any kind of input signal.

Gain variation according to RSSI (Received Signal Strength Indicator) measurements based on predefined threshold values (e.g., exceeding the threshold value).

Generic gain variation according to RSSI measurements (e.g., on-the-fly).

Figure 6:
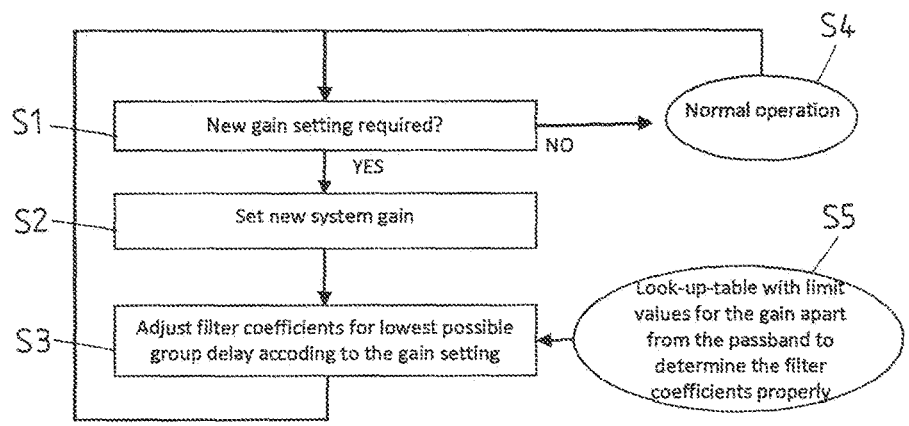
FIG. 6 shows a flow chart of a process for controlling filter coefficients of a digital filter according to one aspect.

A flow chart of an example of a process for optimizing the filter coefficients is illustrated in FIG. 6. If it is found that a new gain setting is needed in block S1, depending, for example, on a network coverage provided in an area, a new system gain is set in block S2. If instead it is found that that no new gain setting is required, it is continued with normal operation in block S4.

If a new system gain is applied in block S2, the filter coefficients are adjusted such that a lowest possible group delay according to the gain setting is obtained in block S3. For example, the lowest number of filter coefficients possible can be used such that the gain limits G2-G4 apart from the passband PB as illustrated in FIG. 5 are not exceeded. This may occur according to a lookup table defining the gain limit values G2-G4 apart from the passband PB, which then may be used to determine the filter coefficients.

In an additional aspect, the repeater system 1 can provide a base amplification (gain) for the entire frequency band, where the gain setting for this amplification is independent of network coverage. If an additional gain is to be provided for a signal associated with a particular communication channel of a subband, a gain for this subband may additionally be set such that the signal is additionally—beyond the base amplification—amplified.

The additional amplification may be caused by a gain setting of a gain control device $213_1$-$213_N$ associated with a particular communication channel, as shown in FIG. 3. Depending on the gain setting of the gain control device $213_1$-$213_N$, the filter coefficients of the digital filters $211_1$-$211_N$, $212_1$-$212_N$ processing the signal may be optimized in the fashion described above such that the group delay for the signal is optimized.

The repeater system 1 in any case can provide a base amplification that is applied to the entire frequency band and is broadband (in contrast to the narrowband amplification acting onto the separate communication channels). The narrowband amplification for the separate communication channels can be optimized as described above, depending on the network coverage, and the filter coefficients for a particular communication channel can be optimized based on the gain setting for the communication channel.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A digital repeater system for repeating RF signals, the digital repeater system comprising:

a receiving section comprising an analog-to-digital converter, the receiving section configured for receiving an RF input signal that includes at least one frequency band having at least one subband associated with at least one communication channel of a telecommunications network, the receiving section being configured to digitize the RF input signal to obtain a digital signal;

a filter device comprising at least one digital filter having a passband for digitally filtering the digital signal, the at least one digital filter being configurable by setting filter coefficients;

a gain control device configurable to set a gain of at least a portion of the digital signal;

at least one transmitting section comprising a digital-to-analog converter, the at least one transmitting section configured for transmitting an RF output signal and for converting the digital signal to the RF output signal for transmission; and a control unit adapted to configure the filter coefficients of the at least one digital filter in response to a change in the gain setting of the gain control device, wherein the filter coefficients are configured based on the change in the gain setting to optimize group delay.

2. The digital repeater system according to claim 1, wherein a steepness or width of the passband is adjustable by setting the filter coefficients.

3. The digital repeater system according to claim 1, wherein the at least one digital filter is a FIR filter.

4. The digital repeater system according to claim 1, wherein the at least one digital filter includes:
   a first digital filter of a high order that is configurable for a high gain setting, and
   a second digital filter of a low order having an order lower than the high order and configurable for a low gain setting that is lower than the high gain setting.

5. The digital repeater system according to claim 4, wherein a number of filter coefficients used for the high order is larger than for the low order.

6. The digital repeater system according to claim 1, wherein the gain is set based on a network coverage in an area.

7. The digital repeater system according to claim 1, wherein the filter coefficients are adjustable based on a change in the gain setting.

8. The digital repeater system according to claim 1, wherein the filter coefficients are adjustable to minimize group delay.

9. The digital repeater system according to claim 1, wherein a network coverage is determined according to:
   a signal received from a base station; or
   location information obtained via a GPS signal.

10. The digital repeater system according to claim 1, further comprising:
    a host unit; and
    at least one remote unit positionable remotely to the host unit configured for communicatively coupling to the host unit via a transport medium.

11. A method comprising:
    receiving an RF input signal by a receiving section of a digital repeater system, the RF input signal comprising at least one frequency band including at least one subband associated with at least one communication channel of a telecommunications network, the receiving section digitizing the RF input signal to form a digital signal;
    digitally filtering the digital signal by a filter device comprising at least one digital filter having a passband for filtering the digital signal, wherein the at least one digital filter is configured by setting filter coefficients;
    controlling a gain of the digital signal by a gain control device that sets the gain of the digital signal;
    configuring the filter coefficients of the at least one digital filter in response to a change in the gain setting of the gain control device, based on the gain of the gain control device set by a control unit, wherein the filter coefficients are configured based on the change in the gain setting to optimize group delay; and
    converting the digital signal to an RF output signal and transmitting the RF output signal by at least one transmitting section of the digital repeater system.

12. The method according to claim 11, wherein configuring the filter coefficients includes adjusting a steepness or width of the passband.

13. The method according to claim 11, wherein the at least one digital filter is a FIR filter.

14. The method according to claim 11, wherein the at least one digital filter includes:
    a first digital filter of a high order having a high gain setting; and
    a second digital filter of a low order having an order lower than the high order and a low gain setting that is lower than the high gain setting.

15. The method according to claim 14, wherein a number of filter coefficients used for the high order is larger than for the low order.

16. The method according to claim 11, wherein the gain is set based on a network coverage in an area.

17. The method according to claim 11, wherein the filter coefficients are adjusted based on a change in the gain setting.

18. The method according to claim 11, wherein the filter coefficients are adjusted to minimize group delay.

19. The method according to claim 11, further comprising determining network coverage according to:
    a signal received from a base station; or
    location information obtained via a GPS signal.

20. The method according to claim 11, wherein the digital repeater system includes:
    a host unit; and
    at least one remote unit positioned in a carriage of a train and remotely to the host unit, the at least one remote unit being communicatively coupled to the host unit via a transport medium.

* * * * *